March 4, 1930.  A. Y. DODGE  1,749,022
BRAKING OF WHEELS
Filed Feb. 23, 1927   4 Sheets-Sheet 2
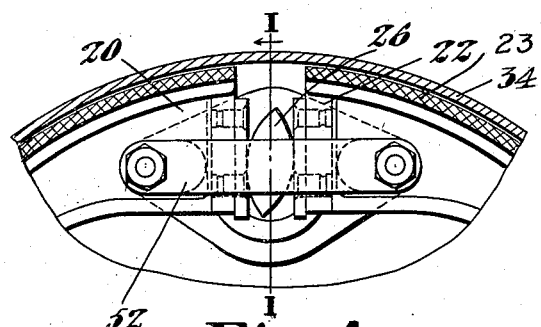
Fig.4.
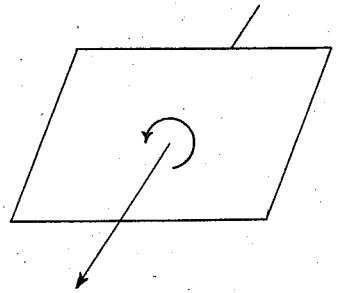
Fig.5.
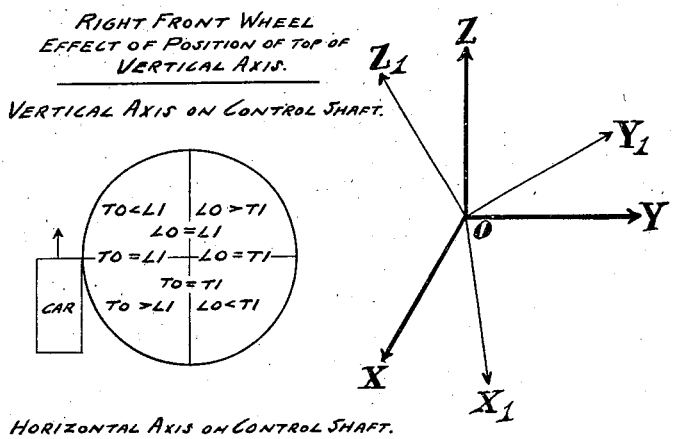
Fig.6.
Fig.12.
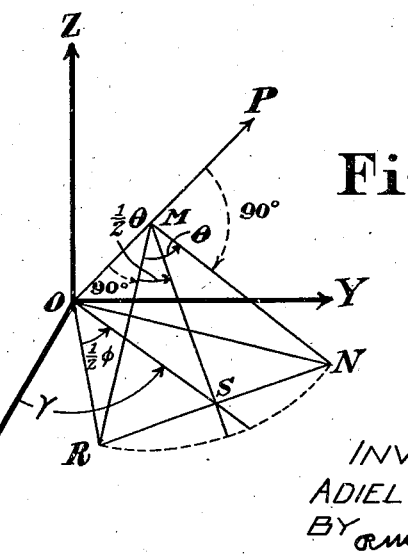
Fig.7.
INVENTOR_
ADIEL Y. DODGE
BY
ATTORNEY_

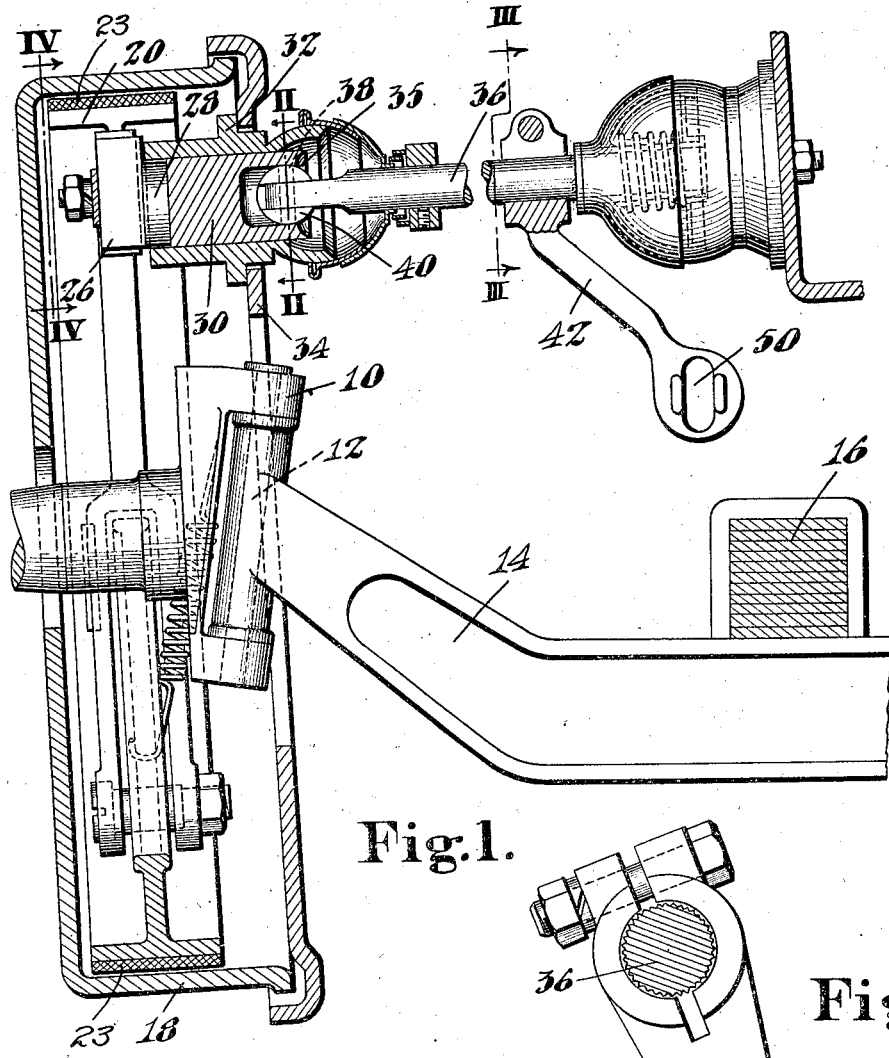
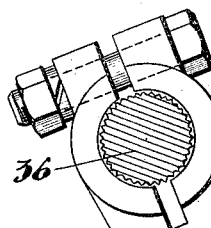
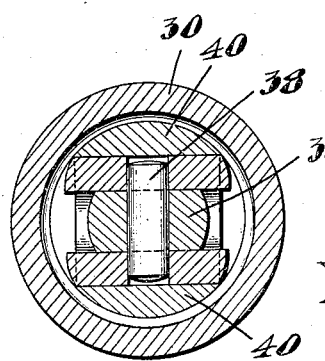
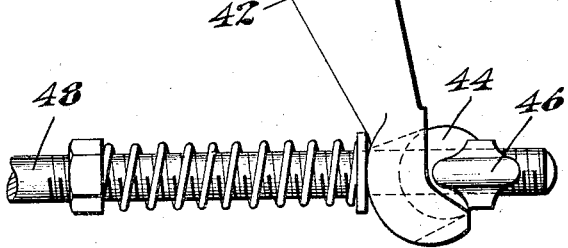

March 4, 1930.   A. Y. DODGE   1,749,022
BRAKING OF WHEELS
Filed Feb. 23, 1927   4 Sheets-Sheet 3

INVENTOR.
ADIEL Y. DODGE.
BY
ATTORNEY.

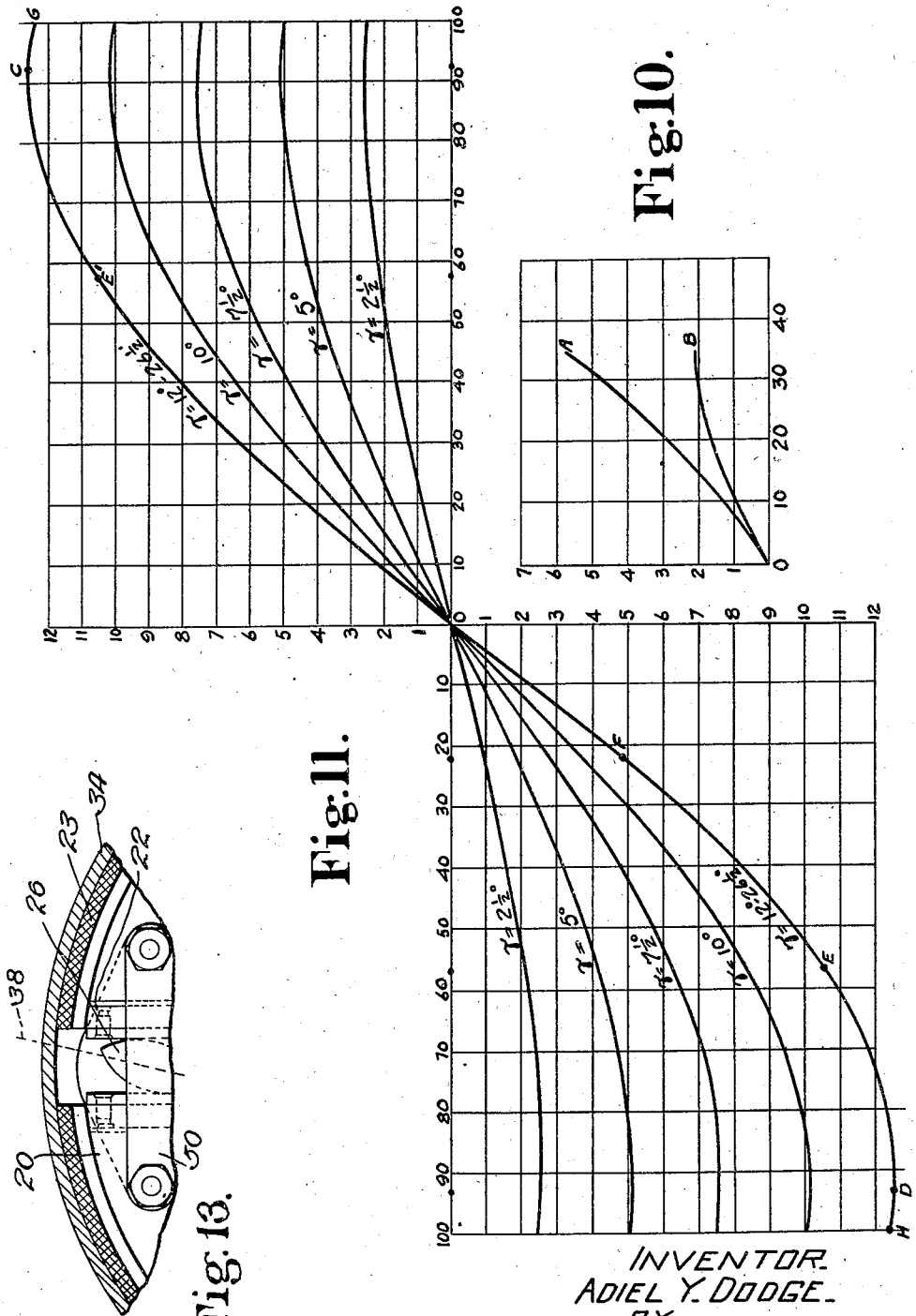

Patented Mar. 4, 1930

1,749,022

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKING OF WHEELS

Application filed February 23, 1927. Serial No. 170,133.

This invention relates to brakes for swiveled wheels and is disclosed in connection with a front wheel brake for automobile wheels of the type disclosed in United States Letters Patent No. 1,604,394, granted October 26, 1926, on my application.

A front wheel of an automobile is not necessarily vertical. Its upper portion may tilt to the outside, and the king pin, or swivel, on which it is hung, may tilt correspondingly to the inside so that its axis intersects the wheel plane at or near the point of contact of the wheel with the ground. The king pin is often also tilted somewhat, backward through the so-called "caster angle." The brake in such a wheel is operated generally by means including a universal joint approximately in line with the king pin, which forces the brake shoes against a drum. The turning of the wheel, after the brake is set, unless one of the axes of the universal joint is collinear with the king pin axis at this time, will in itself change the conditions under which the joint operates and can be arranged to cause the brake on one front wheel to tighten and on the other front wheel to loosen.

Previous to the present invention, such brakes have been constructed in two ways, one, mentioned above, in which an axis of the universal joint is collinear with the king pin axis when the brake is set, and the second in which an axis of the joint, though not collinear with the king pin axis, appears in substantially the same nearly vertical plane as the king pin axis when viewed from the side after the brake has been set. In the first construction the turning of the wheel does not affect the condition of the brake. In the second construction, the brake on one side tightens, and that on the other side loosens, and these effects are equal in magnitude on both sides, assuming the wheels to have turned through the same angle. There is a decided advantage in having the brake on the outside front wheel loose in going around a corner, in that the danger of skidding is diminished, and the axes of the joint have been generally so arranged as to bring this about. The total braking force exerted by the operator was then applied to the other three wheels, and since the inside front wheel brake had been tightened by the turning of that wheel, this unbalanced the effect of the brakes on the three heavily braked wheels, and under some conditions in itself created a tendency to skid.

The object of the present invention is to preserve the advantage inherent in the relief of the outside front wheel brake while avoiding the danger of skidding due to the unbalancing of the braking action on the other three wheels, and accordingly to so construct the brake apparatus that the relief of the outside front wheel brake takes place much more rapidly than the tightening of the inside front wheel brake, as these wheels are turned, thus minimizing the difference in the braking action on the three heavily braked wheels.

I have found that this can be accomplished by making the vertical axis of the universal joint tilt out of the nearly or quite vertical plane in which the king pin axis is seen from the side when the brakes are set. This unbalances the effects on the two front wheels which are due to their turning to the side. The relative effects on the front wheels can be varied between wide limits by varying the amount of this laterally apparent tilt in accordance with the theory which I shall explain in the annexed specification. I am thus enabled to relieve the outside front wheel brake to any desired degree without correspondingly tightening the brake on the inside front wheel, and thus unbalancing to a prejudicial extent the braking action on the three remaining wheels.

In the accompanying drawings, which show a preferred embodiment of the invention, Fig. 1 is a partly sectional front elevation of the right front wheel of an automobile, and also shows a cross-section on the line I—I of Fig. 4;

Fig. 2 is a section on the line II—II of Fig. 1;

Fig. 3 is a section on the line III—III of Fig. 1;

Fig. 4 is a section on the line IV—IV of Fig. 1;

Figs. 5 to 8 are diagrams illustrating the mathematical theory to be developed;

Fig. 10 shows graphically the braking results derived from the set-up shown in Fig. 9;

Fig. 11 is a diagram by means of which practical factory problems in brake setting may be solved;

Fig. 12 is a diagram generally illustrating the phenomena discussed herein and

Fig. 13 is a view similar to Fig. 4 showing the parts in the brake-set position.

Figure 8:
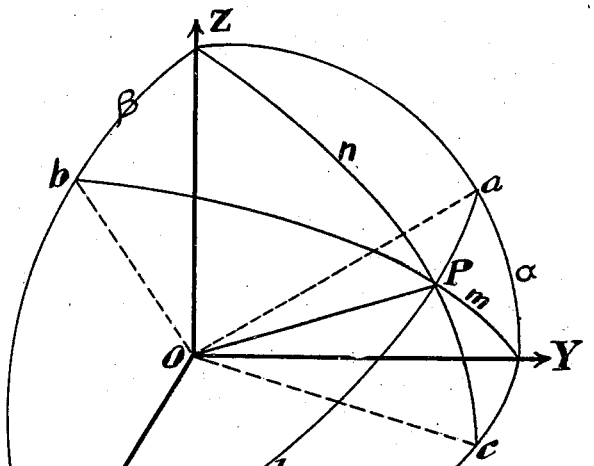

In the arrangement selected for illustration, the brake acts on a right front wheel rotatably mounted on a knuckle 10 swivelled by a king pin 12 on the end of an axle 14 supporting a chassis frame 16.

The wheel includes a drum 18, within which are arranged a plurality of shoes 20, 22, having a brake lining 23 which are forced against the drum for braking action by a cam 26 as described in the patent referred to. The cam 26 is secured to, or integral with, a member 28 fitting into a key slot in the end of a camshaft 30.

The camshaft 30 is journaled in a cylindrical bore in a bearing or support 32 bolted to a backing plate 34 mounted fixedly on the knuckle 10.

The inner end of the camshaft 30 is bored out conically or spherically at 35, to give as much play as possible to a control shaft 36, having a rounded and flattened end swiveled by a pin 38 between two members 40 having inner flat surfaces engaging the flattened end of the shaft, and having cylindrical outer surfaces journaled in a normally horizontal cross bore or bearing in the end of the camshaft 30.

The control shaft 36 is fluted to be embraced by a split clamp formed on the end of an arm 42, thus providing for angular adjustment of the arm by loosening the clamp. The bottom of the arm is formed with a spherical socket or seat for a member 44, which may be integral with, or backed by, a nut 46 threaded on a link 48 operated by the pedal connections and passing through an opening 50 intersecting the seat for member 44.

The elements 30, 36, 38, 40 constitute in effect a universal joint of the well known type. The axis of the pin 38, mounted in the control shaft 36 will hereinafter be called the "vertical axis;" the axis of the members 40, which is in effect rigid in the camshaft 30, will be called the "horizontal axis." The center of the joint, that is the intersection of these axes, is located in the axis of the king pin.

The inner end of the control shaft is supported in a ball and socket joint on the chassis 16, as described in the patent referred to.

Fig. 1 shows the parts as they are with the machine going straight ahead with the brakes off, the vertical axis lying approximately in a vertical plane transverse to the car. The control and cam shafts are shown collinear but there is often a few degrees variation in this alinement due to the limitations of space on the chassis and its vertical position under load.

The setting of the brake is accomplished by pulling the arm 42 backward, rotating the shafts 36 and 30 and the universal joint, thus turning the cam 26 to crowd the brake shoes to the drum, as shown in Fig. 13. The position of the vertical axis is there indicated by a line marked 38.

Assuming that the control shaft is held fast when the wheel is turned by the steering mechanism, the turning of the wheel causes a small rotation of the cam shaft relatively to the backing plate 34, due to the fact that the vertical axis of the joint is not collinear with the king pin axis. In order to set the brakes, a rotation of the control shaft of 6°–8° is necessary, which will turn the top of the vertical axis over toward the observer of Fig. 1. Previous devices of this character have been so arranged that the vertical axis after being so thrown comes into the transverse vertical plane, or a plane perpendicular to the wheel plane and containing the king pin axis. With such an arrangement when the wheel is turned, the parts move in such manner that the cam loosens the brake on an outside wheel and tightens the brake on an inside wheel, these effects being equal.

By means of the present invention I am enabled to vary these actions relatively, that is to cause the outside wheel brake to loosen faster or slower than the inside wheel brake. I have found that the relation of the tightening and loosening effects depends upon the position of the vertical axis at the time the wheel is turning, that is, on the position to which it is thrown by the act of setting the brakes. If the top of the vertical axis is thrown forward of and outside of the king pin axis in setting the brake an outside wheel brake will loosen faster than an inside one tightens; if it is thrown backward of and outside of the king pin axis an inside brake will tighten faster than an outside one loosens.

I will now show how the effect may be determined exactly in any given case.

It will be necessary first to establish a number of mathematical considerations, upon which the analysis depends, and I will first derive general Formulæ (11) and (12) below, relating to revolution about an axis passing through the origin and having the direction cosines $l, m, n$.

We shall need to recall the following relations from analytic geometry.

If $l$, $m$, $n$, are the direction cosines of a line,
$$l^2 + m^2 + n^2 = 1 \quad (A)$$

If two lines are given by their direction cosines, the angle between them is given by
$$\cos \varphi = ll' + mm' + nn' \quad (B)$$
$$\sin \varphi = \sqrt{(mn' - m'n)^2 + (nl' - n'l)^2 + (lm' - l'm)^2} \quad (C)$$

Let
$$\begin{aligned} x_1 &= a_{11}x + a_{12}y + a_{13}z \\ y_1 &= a_{21}x + a_{22}y + a_{23}z \\ z_1 &= a_{31}x + a_{32}y + a_{33}z \end{aligned} \quad (D)$$

represent a transformation of coordinates from one rectangular system, XYZ, to another, $X_1Y_1Z_1$, through the same origin. If the unit sphere around the origin is considered, this can also be regarded as a transformation which transforms the sphere into itself, without relative displacements of any of its points. It therefore represents a rotation of the sphere around a certain axis through a certain angle.

The object of the following analysis is to establish the relation between the direction cosines of the transformation (D) on the one hand and the direction cosines of the axis around which the equivalent rotation takes place and the amount of rotation on the other hand; and vice versa. By means of this relationship the effect of the turning of the wheel on the braking can be determined with accuracy, as will be seen.

In the following discussion all lines will be regarded as directed and their direction cosines will refer to their positive ends, and positive rotation about a line will be such as represented in Fig. 5. The axes used will be right handed, such that a positive rotation about the Z axis will turn X toward Y, etc.

The $a$'s in (D) are the direction cosines of the two sets of axes relatively to each other, according to the following table:

$$\begin{array}{c|ccc} & X & Y & Z \\ \hline X_1 & a_{11} & a_{12} & a_{13} \\ Y_1 & a_{21} & a_{22} & a_{23} \\ Z_1 & a_{31} & a_{32} & a_{33} \end{array} \quad (E)$$

Since $OX_1$ is perpendicular to $OY_1$ and $OZ_1$;
$$\begin{aligned} a_{11}a_{21} + a_{12}a_{22} + a_{13}a_{23} &= 0 \\ a_{11}a_{31} + a_{12}a_{32} + a_{13}a_{33} &= 0 \end{aligned} \quad (F)$$

whence
$$\frac{a_{11}}{a_{22}a_{33} - a_{32}a_{23}} = \frac{a_{12}}{a_{23}a_{31} - a_{33}a_{21}} = \frac{a_{13}}{a_{21}a_{32} - a_{31}a_{22}} = K = 1 \quad (G)$$

as will be seen from the following:

$$a_{11}^2 + a_{12}^2 + a_{13}^2 = 1 = K^2[(a_{22}a_{33} - a_{32}a_{23})^2 + (a_{23}a_{31} - a_{33}a_{21})^2 + (a_{21}a_{32} - a_{31}a_{22})^2]$$

The quantity in the brackets is the square of the sine of the angle between $OY_1$ and $OZ_1$, by (C), and is therefore equal to unity, so that $K = \pm 1$. The positive sign is the correct one when the $a$'s are arranged in cyclical order, as above, as can be seen from Fig. 6. For suppose that $Y_1$ is in the OXY plane. Then $a_{23} = 0$. Then in Fig. 6 $a_{11} = \cos X O X_1$, $a_{22} = \cos Y O Y_1$, $a_{33} = \cos Z O Z_1$, are all positive, and since as the $X_1Y_1Z_1$ set of axes rotates in any way, the numerical characteristics of the system change continuously, the value $K = +1$ must apply universally, and we have, in the determinant of the cosines, each element equal to its own first minor. This determinant is then $$\begin{vmatrix} a_{11} & a_{12} & a_{13} \\ a_{21} & a_{22} & a_{23} \\ a_{31} & a_{32} & a_{33} \end{vmatrix} = a_{11}^2 + a_{12}^2 + a_{13}^2 = 1 \quad (H)$$

Any such change of axes as we are discussing can be effected by three consecutive rotations about the axes in turn, so that of these nine $a$'s only three are independent. We proceed to express them in terms of three independent quantities.

By (A)
$$\begin{aligned} a_{23}^2 &= 1 - a_{13}^2 - a_{33}^2 \\ a_{32}^2 &= 1 - a_{12}^2 - a_{22}^2 \end{aligned}$$

whence
$$a_{23}^2 + a_{32}^2 = 2 - a_{12}^2 - a_{13}^2 - a_{22}^2 - a_{33}^2 = 1 + a_{11}^2 - a_{22}^2 - a_{33}^2 \quad (I)$$

and by (G)
$$2a_{23}a_{32} = -2a_{11} + 2a_{22}a_{33} \quad (J)$$

By addition and substraction of (I) and (J)
$$\begin{aligned} (a_{23} + a_{32})^2 &= (1 - a_{11})^2 - (a_{22} - a_{33})^2 \\ &= (1 - a_{11} + a_{22} - a_{33})(1 - a_{11} - a_{22} + a_{33}) \quad (K) \\ (a_{23} - a_{32})^2 &= (1 + a_{11} + a_{22} + a_{33})(1 + a_{11} - a_{22} - a_{33}) \end{aligned}$$

The parentheses on the right of each of (K) are either both positive or both negative. If those in the first equation are negative, their sum, $1 - a_{11}$, is negative, which is impossible, since $a_{11}$ is a cosine. Similarly those in the second equation are positive. Therefore we may put
$$\begin{aligned} 4a_0^2 &= 1 + a_{11} + a_{22} + a_{33} \\ 4a_1^2 &= 1 + a_{11} - a_{22} - a_{33} \\ 4a_2^2 &= 1 - a_{11} + a_{22} - a_{33} \\ 4a_3^2 &= 1 - a_{11} - a_{22} + a_{33} \end{aligned} \quad (L)$$

Assume
$$\begin{aligned} a_{23} + a_{32} &= 4a_2 a_3 \\ a_{23} - a_{32} &= -4a_0 a_1 \end{aligned} \quad (M)$$

where the signs chosen for the square roots remain to be justified. Then $$a_{23}=2(a_2a_3-a_0a_1)$$
$$a_{32}=2(a_2a_3+a_0a_1)$$

Similarly, or by advancing subscripts cyclically, we get the set of double-different-subscript $a$'s in terms of the single subscript $a$'s.

$$\begin{array}{ll} a_{23}=2(a_2a_3-a_0a_1) & a_{31}=2(a_1a_3-a_0a_2) \\ a_{32}=2(a_2a_3+a_0a_1) & a_{13}=2(a_1a_3+a_0a_2) \\ & a_{12}=2(a_1a_2-a_0a_3) \\ & a_{21}=2(a_1a_2+a_0a_3) \end{array} \quad (N)$$

and from (L)

$$\begin{array}{l} a_{11}=a_0^2+a_1^2-a_2^2-a_3^2 \\ a_{22}=a_0^2-a_1^2+a_2^2-a_3^2 \\ a_{33}=a_0^2-a_1^2-a_2^2+a_3^2 \end{array} \quad (O)$$

$$a_0^2+a_1^2+a_2^2+a_3^2=1 \quad (P)$$

We now have all the double subscript $a$'s expressed in terms of four single subscript $a$'s, subject to the condition (P).

As to the signs assumed in (M), if we substitute the value of the double subscript $a$'s from (N) and (O) in the six possible such equations as (B), we easily find that they are satisfied. The same is true of the six equations such as (A), and the system (N), (O) therefore forms a consistent system of direction cosines.

The assumption in (M) does not determine the signs of the single subscript $a$'s, but only the signs of their products. By comparison with the terms of (D), the signs of the products can be determined, and then two sets of signs can be determined for the single subscript $a$'s, each the opposite of the other. These, as will be seen, simply give the two ends of the axis, and the corresponding angles of rotation.

We will next find the axis of rotation implied in (D). Take a point $(x, y, z)$ on the unit sphere, which transforms into itself under the transformation (D). We then have $$\begin{array}{l} (a_{11}-1)x + a_{12}y + a_{13}z = 0 \\ a_{21}x + (a_{22}-1)y + a_{23}z = 0 \\ a_{31}x + a_{32}y + (a_{33}-1)z = 0 \end{array} \quad (Q)$$

whence $$\frac{x}{(a_{22}-1)(a_{33}-1)-a_{32}a_{23}}=\frac{y}{a_{23}a_{31}-(a_{33}-1)(a_{21})}=\frac{z}{a_{21}a_{32}-a_{31}(a_{22}-1)} \quad (1)$$

and remembering that any element in (H) is equal to its own first minor, we have, $$\frac{x}{a_{11}-a_{22}-a_{33}+1}=\frac{y}{a_{12}+a_{21}}=\frac{z}{a_{13}+a_{31}}$$

Substituting from (N), (O); and from (P), for $x$;

$$\frac{x}{1-a_0^2+3a_1^2-a_2^2-a_3^2}=\frac{x}{4a_1^2}=\frac{y}{4a_1a_2}=\frac{z}{4a_1a_3}=K \quad (2)$$

Since $(x, y, z)$ is on the unit sphere:

$$x^2+y^2+z^2=1=K^2[16a_1^4+16a_1^2a_2^2+16a_1^2a_3^2],$$

and $$K=\frac{1}{4a_1\sqrt{a_1^2+a_2^2+a_3^2}} \quad (3)$$

Hence $$x=\frac{a_1}{\sqrt{a_1^2+a_2^2+a_3^2}}=l, \quad y=\frac{a_2}{\sqrt{a_1^2+a_2^2+a_3^2}}=m,$$

$$z=\frac{a_3}{\sqrt{a_1^2+a_2^2+a_3^2}}=n \quad (4)$$

Since the point $(x, y, z)$ did not move, it lies on the axis of rotation, and since it is at unit distance from the origin, the above values of $x$, $y$, and $z$ are the direction cosines of the axis of rotation, $l$, $m$, $n$.

We find the angle, $\theta$, of rotation, as follows: Construct a plane through the Z axis and the axis of rotation, and consider points of the unit sphere which are just rotated into the plane by a rotation of $\tfrac{1}{2}\theta$, and through the plane to the reflections of their original positions, by the whole rotation $\theta$. Such points will lie on a great circle of the sphere angularly distant, around the axis, by $\tfrac{1}{2}\theta$ from the plane. In Fig. 7 OP is the axis of rotation, and OMS is the plane through the axis and OZ. The planes OMR and OMN make angles of $\tfrac{1}{2}\theta$ on each side of OMS. OR and ON are the intersections of these planes with OXY, and R and N are taken at unit distance from O. MR and MN are taken perpendicular to OP, and RSN is perpendicular to OS. The projection, along OP, of the angle $\tfrac{1}{2}\theta$, on the XY plane, is $\tfrac{1}{2}\phi=ROS$.

By (4), and by (16), proved later, the projection angle $\gamma$, of the POS plane on the OXY plane, is given by $$\tan \gamma = \frac{m}{l}=\frac{a_2}{a_1}=\frac{\cos YOP}{\cos XOP} \quad (4\tfrac{1}{2})$$

Also $$\tan \tfrac{1}{2}\phi = \frac{RS}{OS}$$

$$\tan \tfrac{1}{2}\theta = \frac{RS}{MS}$$

$$\frac{MS}{OS}=\cos OSM = \cos ZOP = \frac{a_3}{\sqrt{a_1^2+a_2^2+a_3^2}}$$

Hence $$\tan \tfrac{1}{2}\phi = \frac{a_3}{\sqrt{a_1^2+a_2^2+a_3^2}}\tan \tfrac{1}{2}\theta \quad (5)$$

For the point R;

$$x=\cos(\gamma-\tfrac{1}{2}\phi), \quad y=\sin(\gamma-\tfrac{1}{2}\phi), \quad z=0 \quad (6)$$

For the point N;

$$x = \cos(\gamma + \tfrac{1}{2}\phi) \quad y = \sin(\gamma + \tfrac{1}{2}\phi), z = 0 \quad (7)$$

and R is moved to N by the rotation.

Substitute (6) and (7) in the third of (D):

$$a_{31} \cos(\gamma - \tfrac{1}{2}\phi) + a_{32} \sin(\gamma - \tfrac{1}{2}\phi) = 0$$

Express the double subscript $a$'s by single subscript $a$'s by (N), expand the trigonometric terms, divide by $\cos \gamma \cos \tfrac{1}{2}\phi$, and substitute for $\gamma$ and $\phi$ by (4½) and (5), and we obtain $$Na_{11} = k^2 + l^2 - m^2 - n^2$$
$$Na_{21} = 2(lm + kn)$$
$$Na_{31} = 2(ln - km)$$

$$\cot \tfrac{1}{2}\theta = \frac{a_0}{\sqrt{a_1^2 + a_2^2 + a_3^2}} \quad (8)$$

Put $$\cot \frac{\theta}{2} = k \quad (9)$$

Then, by (P) putting $N = k^2 + 1$ $$N = k^2 + 1 = \frac{1}{\sin^2 \tfrac{1}{2}\theta} = \frac{a_0^2}{a_1^2 + a_2^2 + a_3^2} + 1 = \frac{1}{a_1^2 + a_2^2 + a_3^2} \quad (10)$$

Then, putting $l, m, n$ for the direction cosines of the axis, OP, in (4), and substituting in (N), (O), we have $$a_{11} = \frac{1}{N}(k^2 + l^2 - m^2 - n^2)$$

$$a_{22} = \frac{1}{N}(k^2 - l^2 + m^2 - n^2)$$

$$a_{33} = \frac{1}{N}(k^2 - l^2 - m^2 + n^2) \quad (11)$$

$$a_{12} = \frac{2}{N}(lm - kn) \quad a_{31} = \frac{2}{N}(ln - km)$$

$$a_{21} = \frac{2}{N}(lm + kn) \quad a_{23} = \frac{2}{N}(mn - kl)$$

$$a_{13} = \frac{2}{N}(ln + km) \quad a_{32} = \frac{2}{N}(mn + kl)$$

Formulæ (4) and (8) give the direction cosines of the axis, and the amount, of the rotation (D) in terms of the single subscript $a$'s, and formula (L) gives the single subscript $a$'s in terms of the double subscript $a$'s of (D). We can thus determine the axis and amount of rotation corresponding to any given transformation D.

On the other hand, if we are given the axis and the amount of the rotation, Formula (11) gives the double subscript $a$'s for the equivalent transformation (D).

Heretofore we have assumed the axis of rotation to pass through the origin. If it does not, let $(\alpha, \beta, \gamma)$ be a point in it. Then the coordinates of $(x, y, z)$ and $(x_1, y_1, z_1)$ referred to a system of parallel axes through $(\alpha, \beta, \gamma)$ as origin, are respectively, $$(x - \alpha, y - \beta, z - \gamma), \text{ and } (x_1 - \alpha, y_1 - \beta, z_1 - \gamma),$$

and we have $$x_1 - \alpha = a_{11}(x - \alpha) + a_{12}(y - \beta) + a_{13}(z - \gamma)$$
$$y_1 - \beta = a_{21}(x - \alpha) + a_{22}(y - \beta) + a_{23}(z - \gamma) \quad (12)$$
$$z_1 - \gamma = a_{31}(x - \alpha) + a_{32}(y - \beta) + a_{33}(z - \gamma)$$

where $$Na_{12} = 2(lm - kn) \quad Na_{13} = 2(ln + km)$$
$$Na_{22} = k^2 - l^2 + m^2 - n^2 \quad Na_{23} = 2(mn - kl)$$
$$Na_{32} = 2(mn + kl) \quad Na_{33} = k^2 - l^2 - m^2 + n^2$$

$$k = \cot \frac{\theta}{2}$$

$$\frac{1}{N} = \frac{1}{k^2 + 1} = \sin^2\left(\frac{\theta}{2}\right)$$

In the following investigation, the origin will first be taken at the center of the universal joint, with the Z axis vertically upward, the X axis horizontal and pointing straight to the outside right of the car, and the Y axis perpendicular to both and extending forward. The king pin is not vertical. Its top slopes some 5°—8° inward and about 2½° backward. Its position and that of other parts will ordinarily be given by elevations and plans in drawings, and it is necessary to establish formulæ for relating a line so given to the coordinate axes.

Let P (Fig. 10) be the intersection of the positive end of the line in question with the unit sphere around the origin. The direction cosines $l, m, n$ are marked on their arcs and the spherical angles at $a, b, c$ are all 90°. The projection angles, $\alpha, \beta, \gamma$, are marked in the figure.

Then the equations of the line OP are $$\frac{z}{y} = \tan \alpha \quad \frac{x}{z} = \tan \beta \quad \frac{y}{x} = \tan \gamma \quad (13)$$

Of course there are in reality only two independent equations here; multiplying them, we obtain $$\tan \alpha \tan \beta \tan \gamma = 1 \quad (14)$$

Putting the equations in the form $$\frac{y}{\tan \gamma} = x = \frac{z}{\cot \beta}$$

we get the direction cosines of the line OP;

$$l = \frac{1}{\sqrt{1 + \cot^2 \beta + \tan^2 \gamma}}$$

$$m = \frac{\tan \gamma}{\sqrt{1 + \cot^2 \beta + \tan^2 \gamma}} = \frac{1}{\sqrt{1 + \cot^2 \gamma + \tan^2 \alpha}} \quad (15)$$

$$n = \frac{\cot \beta}{\sqrt{1 + \cot^2 \beta + \tan^2 \gamma}} = \frac{1}{\sqrt{1 + \cot^2 \alpha + \tan^2 \beta}}$$

By division we obtain from (15)

$$\tan \alpha = \frac{n}{m}, \tan \beta = \frac{l}{n}, \tan \gamma = \frac{m}{l} \quad (16)$$

From such right triangles as XPc, XPb, we get $$\cot \cos^{-1} l = \frac{l}{\sqrt{1-l^2}} = \cos \alpha \cot \gamma = \sin \alpha \tan \beta$$

$$\cot \cos^{-1} m = \frac{m}{\sqrt{1-m^2}} = \cos \beta \cot \alpha = \sin \beta \tan \gamma \quad (17)$$

$$\cot \cos^{-1} n = \frac{n}{\sqrt{1-n^2}} = \cos \gamma \cot \beta = \sin \gamma \tan \alpha$$

$$\frac{lmn}{\sqrt{1-l^2}\sqrt{1-m^2}\sqrt{1-n^2}} = \cos \alpha \cos \beta \cos \gamma = \sin \alpha \sin \beta \sin \gamma \quad (18)$$

Formulæ (15) and (17) the latter of which is adapted for logarithmic computation, give the direction cosines of a line in terms of its projection angles, and Formula (16) gives the angles in terms of the cosines.

For the sake of completeness, the formula for the universal joint is included here, without proof, which can be found in text books on mechanism. The formula is $$\tan \phi = \tan \theta \cos \delta \quad (19)$$

where $\phi$ is the angle turned by the following shaft of the joint, $\theta$ is the angle turned by the driving shaft, both measured from the line of intersection of the planes of the driving and following axes, and $\delta$ is the acute angle between the driving and following shafts.

We can thus determine the direction cosines of any line given on the machine drawings. We shall have to so determine the cosines of the king pin axis, the control and cam shafts and one of the axes of the universal joint. The position of the other axis will then be determined by mathematical considerations, as it cannot be accurately enough determined in proper relation to the first axis from a drawing. The method of attack will be thus to determine the direction cosines of all elements with the car going straight ahead and the brake released; then to set the brake, and find the new cosines of the joint axes, and then to turn the wheel and find the new cosines of the horizontal axis, which will give us the angle the cam shaft has been turned by the turning of the wheel. This angle measures the releasing or tightening. To simplify the analytical work, instead of turning the wheel we shall turn the car in the opposite direction, an artifice which will shorten the computation considerably.

The letters $d, e, f$ will be used for the cosines of the control shaft; $i, m, n$ for those of the king pin; $p, q, r$ for those of the cam shaft; $\lambda, \mu, \nu$, for those of the vertical axis; and $s, t, u$, for those of the horizontal axis. Letters relating to the condition of things prior to the brake setting will be marked with naught subscripts if their values change later; and letters relating to conditions after the wheel turning will be marked with primes.

The condition of perpendicularity between the joint axes is $$s\lambda + t\mu + u\nu = 0; \quad (20)$$

between the horizontal axis and the cam shaft is $$sp + tq + ur = 0; \quad (21)$$

and the angle $\psi$ that the cam shaft has been turned by the wheel turning will be given by $$\cos \psi = ss' + tt' + uu' \quad (21\tfrac{1}{2})$$

since this is the angle between the "before and after" positions of the horizontal axis.

After obtaining the $\lambda', \mu', \nu'$ corresponding to a wheel turning, we find the corresponding $s', t', u'$ by (20), (21) combined with $$s'^2 + t'^2 + u'^2 = 1 \quad (22)$$

These Equations (20) (21) (22) can be solved as follows:
From (20) (21)

$$s' : t' : u' = r\mu' - q\nu' : p\nu' - r\lambda' : q\lambda' - p\mu' \quad (23)$$

and putting $$\frac{1}{K} = \sqrt{(r\mu' - q\nu')^2 + (p\nu' - r\lambda')^2 + (q\lambda' - p\mu')^2} \quad (24)$$

= sine of the angle between vertical axis and cam shaft, $$s' = K(r\mu' - q\nu')$$
$$t' = K(p\mu' - r\lambda') \quad (25)$$
$$u' = K(q\lambda' - p\mu')$$

The signs must be determined by inspection.

As will be seen, we shall adopt an artifice whereby $q = o$, so that (24) (25) become $$\frac{1}{K} = \sqrt{\mu'^2 + (p\nu' - r\lambda')^2} \quad (24')$$

$$s' = Kr\mu'$$
$$t' = K(p\nu' - r\lambda') \quad (25')$$
$$u' = -Kp\mu'$$

We shall regard the king pin axis and the vertical axis as positive upward, and the horizontal axis as positive forward, and the shafts as positive away from the joint. We shall regard all these lines as extending one unit from the origin in their positive directions, so that the coordinates of their outside ends will equal their direction cosines.

In case the rotation, $\theta$, of (12) takes place around one of the coordinate axes, the transformation (12) becomes very simple. We shall, accordingly, after finding the cosines of the lines we need in the XYZ system defined above, change the axes to an X'Y'Z' system so that the Z' axis lies in the king pin axis, and the X'Z' plane contains the cam shaft, and the Y' axis extends forwardly. In order to effect this transformation we shall need the cosines of the new axes with respect to the old.

If $\pi, \rho, \sigma$, are the direction cosines of the X'Z' plane, we have as its equation:

$$\pi x + \rho y + \sigma z = 0 \quad (26)$$

and since the normal to this plane is perpendicular to the king pin axis and to the cam shaft, we have $$\pi l + \rho m + \sigma n = 0$$
$$\pi p + \rho q + \sigma r = 0 \quad (27)$$

Eliminating $\pi, \rho, \sigma$, we have $$\begin{vmatrix} x & y & z \\ l & m & n \\ p & q & r \end{vmatrix} = 0 \quad (28)$$

as the equation of the new X'Z' plane referred to the XYZ axes. Its direction cosines $\pi, \rho, \sigma$, which are those of the Y' axis, satisfy the following proportion:

$$\pi : \rho : \sigma = rm - nq : pn - rl : ql - pm \quad (29)$$

and since $\pi^2 + \rho^2 + \sigma^2 = 1$, we have $$\frac{1}{K} = \sqrt{(rm-nq)^2 + (pn-rl)^2 + (ql-pm)^2} \quad (30)$$

= sine of angle between king pin and cam shaft, $$\pi = K(rm - nq)$$
$$\rho = K(pn - rl) \quad (31)$$
$$\sigma = K(ql - pm)$$

The X' axis is normal to the Y'Z' plane, and we get its cosines, $\xi, \eta, \zeta$, in the same way:

$$\frac{1}{K} = \sqrt{(\rho n - \sigma m)^2 + (\sigma l - \pi n)^2 + (\pi m - \rho l)^2} = 1 \quad (32)$$

since the Y' and Z' axes are perpendicular.

$$\xi = K(\rho n - \sigma m) = \rho n - \sigma m$$
$$\eta = K(\sigma l - \pi n) = \sigma l - \pi n \quad (33)$$
$$\zeta = K(\pi m - \rho l) = \pi m - \rho l$$

The table of cosines for the transformation of axes is then

|    | X | Y | Z |
|----|---|---|---|
| X' | $\xi$ | $\eta$ | $\zeta$ |
| Y' | $\pi$ | $\rho$ | $\sigma$ |
| Z' | $l$ | $m$ | $n$ |

(34)

whence $$x' = \xi x + \eta y + \zeta z$$
$$y' = \pi x + \rho y + \sigma z \quad (35)$$
$$z' = lx + my + nz$$

The transformation (35) will enable us to define all our lines with respect to the X'Y'Z' axes.

The axis of rotation when the wheel is turned is now the Z' axis. Therefore, in (12), $l = m = o$ and $n = 1$. Bearing in mind that $$\frac{k^2 - 1}{k^2 + 1} = \frac{\cos^2 \tfrac{1}{2}\theta - \sin^2 \tfrac{1}{2}\theta}{\sin^2 \tfrac{1}{2}\theta} \sin^2 \tfrac{1}{2}\theta = \cos \theta \quad (36)$$

the transformation (12) becomes, if $\lambda, \mu, \nu,$ are the cosines of the line to be rotated, and $\lambda', \mu', \nu',$ are its cosines in its rotated position, simply $$\lambda' = \lambda \cos \theta - \mu \sin \theta$$
$$\mu' = \lambda \sin \theta + \mu \cos \theta \quad (37)$$
$$\nu' = \nu$$

Inasmuch as this transformation has to be used for every angle of wheel turn investigated, the advantage of the transformation (35) is clear.

As a typical case take the following: The king pin 12 of the right front wheel slopes $2\tfrac{1}{2}°$ backward (the caster angle) as seen from the side, or from the positive end of the X axis, and slopes 6° inward as seen from the front, or positive end of the Y axis. The cam shaft 30 is 2° below the X axis, perpendicular to the wheel plane, which is assumed to camber 2°. The control shaft 36 lies 2° behind and 1° above the negative end of the X axis. See Fig. 9 which shows the condition of things at the right front wheel as seen from the left rear of the car. The X and Y axes are positive away from the observer.

The direction cosines of the cam shaft 30 are apparent directly from the figure.

$$p = \cos 2° = 0.9993908$$
$$q = 0 \quad (38)$$
$$r = \cos 92° = -0.03489950$$

We next find the cosines $l, m, n,$ of the king pin axis 12, from (14) and (15).

In solving the Equations (15), the non-symmetrical form is easiest to use, and this sometimes requires a cyclic permutation of the letters in order to bring the two known angles under the radical. We have $\alpha = 92\tfrac{1}{2}°$, seen from X, measured from Y toward Z.

$\beta = 354°$, seen from Y, measured from Z toward X.

$$\cot^2 \alpha = 0.0019063$$
$$\tan^2 \beta = 0.0110469$$
$$\frac{1}{n^2} = \frac{1.}{1.0129532}$$
$$n = +0.9935856$$
$$l = n \tan \beta = -0.1044301 \quad (39)$$
$$m = n \cot \alpha = -0.04338089$$

Next we find the cosines, $d, e, f$, of the control shaft 36.

$$\beta = 271°, \ \gamma = 182°$$
$$\cot^2 \beta = 0.0003047$$
$$\tan^2 \gamma = 0.0012195$$
$$\frac{1}{d^2} = \frac{1.}{1.0015242}$$
$$d = -0.9992388$$
$$e = d \tan \gamma = -0.03489419 \quad (40)$$
$$f = d \cot \beta = +0.017441778$$

Next we find the cosines of the joint axes. One is arbitrary: We shall here assume the $$Na_{11} = +205.50601, \quad Na_{12} = -0.4291228, \quad Na_{13} = -1.0328774$$
$$Na_{21} = +0.5685932, \quad Na_{22} = +203.51149, \quad Na_{23} = +28.578351$$
$$Na_{31} = +0.9631634, \quad Na_{32} = -28.580785, \quad Na_{33} = +203.50966$$
$$a_{11} = +0.9999852, \quad a_{12} = -0.002088097, \quad a_{13} = -0.005025946$$
$$a_{21} = +0.002766755, \quad a_{22} = +0.9902799, \quad a_{23} = +0.1390613$$
$$a_{31} = +0.004686720, \quad a_{32} = -0.1390731, \quad a_{33} = +0.9902710 \quad (46)$$

horizontal shaft horizontal. Therefore:

$$S_0 = 0, \ t_0 = 1, \ u_0 = 0 \quad (41)$$

The vertical axis is perpendicular to the horizontal axis, whence $$\lambda_0 \cdot 0 + \mu_0 \cdot 1 + \nu_0 \cdot 0 = 0, \text{ and}$$
$$\mu_0 = 0 \quad (42)$$

The vertical axis is also perpendicular to the control shaft. Therefore $$\lambda_0 d + \nu_0 f = 0 \text{ and} \quad (43)$$
$$\lambda_0^2 + \nu_0^2 = 1$$

Solving:

$$\lambda_0 = \frac{1}{\sqrt{1 + \left(-\frac{d}{f}\right)^2}}, \ \nu_0 = -\frac{d}{f}\lambda_0 \quad (44)$$

From (40)

$$\frac{d}{f} = -57.28996$$
$$\left(\frac{d}{f}\right)^2 = 3282.1397$$
$$\frac{1}{\lambda_0^2} = \frac{1.}{3283.1397}$$
$$\lambda_0 = +0.01745241$$
$$\mu_0 = 0.$$
$$\nu_0 = +0.9998477 \quad (45)$$

We now know the positions of all the parts when the car is going straight ahead, and will set the brake by turning the control shaft 8°. We could introduce the transformation (35) first, but can save a little work by deferring it. We first find the brake-setting position, $\lambda, \mu, \nu$, of the vertical axis by (12).

$$k = \cot 4° = 14.300666$$
$$\frac{1}{N} = \sin^2 4° = 0.004865966$$

$$l = d = -0.9992388 \quad lm = +0.03486763$$
$$m = e = -0.03489419 \quad ln = -0.01742849$$
$$n = f = +0.01744178 \quad mn = -0.0006086164$$
$$kl = -14.289784 \quad l^2 = +0.9984782$$
$$km = -0.4990102 \quad m^2 = +0.001217604$$
$$kn = +0.2494291 \quad n^2 = +0.0003042153$$
$$k^2 = +204.50906$$

Then, by (12), (46) and (45)

$$\lambda = a_{11}\lambda_0 + a_{13}\nu_0 = +0.01745215 - 0.00502518 = +0.01242697$$
$$\mu = a_{21}\lambda_0 + a_{23}\nu_0 = +0.00004839 + 0.1390401 = +0.1390884 \quad (47)$$
$$\nu = a_{31}\lambda_0 + a_{33}\nu_0 = +0.0000818 + 0.9901202 = +0.9902020$$

We next find $s, t, u$, the corresponding position of the horizontal axis. By (20), (21), (22), (24′), (25′), (38), (47)

$$r\mu = -0.004854116$$
$$r\lambda = -0.0004336950$$
$$p\nu = +0.9895988$$
$$p\nu - r\lambda = +0.9900325$$
$$-p\mu = -0.1390037$$
$$(p\nu - r\lambda)^2 = +0.9801644$$
$$\mu^2 = +0.0193456$$
$$\mu^2 + (p\nu - r\lambda)^2 = +0.9995100$$
$$K = \frac{1}{\sqrt{\mu^2 + (p\nu - r\lambda)^2}} = +1.0002451$$
$$s = Kr\mu = -0.00485531$$
$$t = K(p\nu - r\lambda) = +0.9902752 \quad (47')$$
$$u = K(-p\mu) = -0.1390378$$

We are now ready to turn the wheel about the axis of the king pin, and will here introduce the transformation (35). By (38), (39), (30), (31)

$$\tfrac{1}{K}\pi = rm - nq = +0.001513971 - 0 \quad = +0.001513971$$

$$\tfrac{1}{K}\rho = pn - rl = +0.9929804 - 0.0036446 \quad = +0.9893358$$

$$\tfrac{1}{K}\sigma = ql - pm = 0 - (-0.04335446) \quad = +0.04335446$$

$$\begin{aligned}K &= +1.00980884\\ \pi &= +0.001528821\\ \rho &= +0.9990400 \quad (48)\\ \sigma &= +0.04377972\end{aligned}$$

and by (39), (48), (33)

$$\begin{aligned}\xi &= \rho n - \sigma m = +0.9926318 - (-0.0018992) = +0.9945311\\ \eta &= \sigma l - \pi n = -0.004571921 - 0.001519015 = -0.006090936 \quad (49)\\ \zeta &= \pi m - \rho l = -0.0000663 - (-0.1043298) = +0.1042635\end{aligned}$$

and by (35) the transformation from the old to the new axes is $$\begin{aligned}x' &= +0.9945311\ x - 0.006090936\ y + 0.1042635\ z\\ y' &= +0.001528821\ x + 0.9990400\ y + 0.04377972z \quad (50)\\ z' &= -0.1044301\ x - 0.04338089\ y + 0.99358565z\end{aligned}$$

We will now find the cosines $p'$, $q'$, $r'$, $s'$, $t'$, $u'$, $\lambda'$, $\mu'$, $\nu'$, in the X'Y'Z' system.

From (38), (50);

$$\begin{aligned}p' &= (+0.9945311)(+0.9993908) + (-0.006090931)(0) + (+0.1042635)(-0.03489950)\\ &= 0.9939252 - 0.0036387 = +0.9902865\\ q' &= (+0.001528821)(+0.9993908) + (+0.9990400)(0) + (+0.04377972)(-0.03489950)\\ &= +0.0015279 - 0.0015279 = 0 \quad (51)\\ r' &= (-0.1044301)(+0.9993908) + (-0.04338089)(0) + (0.99358565)(-0.03489950)\\ &= -0.1043665 - 0.0346756 = -0.1390421\end{aligned}$$

Similarly from (47'), (50):

$$\begin{aligned}s' &= -0.00482876 - 0.00603170 - 0.01449657 = -0.02535703\\ t' &= -0.0000074 + 0.9893246 - 0.0060870 = +0.9832301 \quad (52)\\ u' &= +0.0005070 - 0.0429590 - 0.1381460 = -0.1805980\end{aligned}$$

and, from (47) (50)

$$\begin{aligned}\lambda' &= +0.0123590 - 0.0008472 + 0.1032420 = +0.1147538\\ \mu' &= +0.0000190 + 0.1389549 + 0.0433507 = +0.1823246 \quad (53)\\ \nu' &= -0.0012977 - 0.0060338 + 0.9838505 = +0.9765190\end{aligned}$$

As already stated, we shall turn the car instead of the wheel. In turning the car through an angle $+\theta$, that is, from X' toward Y', as seen from Z', we are making the wheel an inside wheel, and vice versa. The computation of (37), (25), (21½) follows. It will be carried through for two angles of wheel-turn.

| $\theta$ | $+20°$ | $-20°$ |
|---|---|---|
| Sin $\theta$ | +0.3420201 | −0.3420201 |
| Cos $\theta$ | +0.9396926 | +0.9396926 |
| $\lambda'\cos\theta$ | +0.1078344 | +0.1078333 |
| $\mu'\sin\theta$ | +0.0623587 | −0.0623587 |
| $\lambda'' = \lambda'\cos\theta - \mu'\sin\theta$ | +0.0454757 | +0.1701920 |
| $\lambda'\sin\theta$ | +0.0392481 | −0.0392481 |
| $\mu'\cos\theta$ | +0.1713291 | +0.1713291 |
| $\mu'' = \lambda'\sin\theta + \mu'\cos\theta$ | +0.2105772 | +0.1320810 |
| $r\mu''$ | −0.0292791 | −0.0183648 |
| $r\lambda''$ | −0.0063229 | −0.0236638 |
| $p\nu''$ | +0.9670336 | +0.9670336 |
| $p\nu'' - r\lambda''$ | +0.9733565 | +0.9906974 |

| | | |
|---|---|---|
| $-p\mu''$ | $-0.2085318$ | $-0.1307980$ |
| $(pv''-r\lambda'')^2$ | $+0.9474229$ | $+0.9814813$ |
| $\mu''^2$ | $+0.0443428$ | $+0.0174454$ |
| $\mu''^2+(pv''-r\lambda'')^2$ | $+0.9917657$ | $+0.9989267$ (54) |
| $K=\dfrac{1}{\sqrt{\mu''^2+(pv''-r\lambda'')^2}}$ | $+1.0041428$ | $+1.0005370$ |
| $s''=Kr\mu''$ | $-0.0294004$ | $-0.0183747$ |
| $t''=K(pv''-r\lambda'')$ | $+0.9773889$ | $+0.9912294$ |
| $u''=K(-p\mu'')$ | $-0.2093957$ | $-0.1308682$ |
| $s's''$ | $+0.0007455$ | $+0.0004659$ |
| $t't''$ | $+0.9609982$ | $+0.9746066$ |
| $u'u''$ | $+0.0378164$ | $+0.0236345$ |
| $\cos\psi$ | $+0.9995601$ | $+0.9987070$ |
| $\psi$ | $1°41'58''$ | $2°54'50''$ |

The result of the full computation (54) is shown graphically in Fig. 10, in which the abscissæ represent angles of wheel-turn and the ordinates of the curve OA represent outside loosening, and those of the curve OB represent inside tightening.

The work terminating in (54) is perfectly general in its nature, and the method there explained can be used in solving any problem. In the actual construction of brakes it is possible to simplify the process somewhat. Suppose the brake has been set, and the appropriate computation carried through to (35), (51), (53). Now assume that the wheel has been turned until the Z' axis, the vertical axis, and the cam shaft all lie in the same plane. The angle of turn to effect this is given by (16):

$$\tan\gamma=\frac{\mu}{\lambda}=\frac{0.1823246}{0.1147538}=1.588834 \quad (55)$$

whence $\gamma=57°\,48.8$

It is obvious that as the wheel turns either way from this position, the phenomena are equal in magnitude on both sides of the plane. Now take this plane as the XZ plane, with the Y axis pointing diagonally forward, we then have $$\begin{aligned}v&=+0.9765190\\ \mu&=0\\ \lambda&=\sqrt{1-v^2}=+0.2154313\\ p&=+0.9902865\\ q&=0.\\ r&=-0.1390421\\ s&=0\\ t&=1\\ u&=0\end{aligned} \quad (56)$$

and (37) becomes $$\begin{aligned}\lambda'&=\lambda\cos\theta\\ \mu'&=\mu\sin\theta\\ v'&=v\end{aligned} \quad (57)$$

and the computation has to be carried out only for positive angles $\theta$

Fig. 11 shows graphically the result of this computation, in the curve OG, which shows the effect of turning the wheel still farther as an outside wheel. The curve OD shows the effect of turning the wheel back to the straight ahead position, and beyond it as an inside wheel. The curves OG, OH are exactly alike, but reversely situated. The point E, 58° to the left of O, corresponds to the straight ahead position of the wheel, and the tightening or loosening effect of turning the wheel is found by comparing the ordinate at E with that of the point representing the wheel turn in question. The segment EF, 35° long, running from 58° to 23°, shows the loosening effect on the outside wheel, and is identical in shape and size with the curve OA in Fig. 10. The segment ED, 35° long, running from 58° to 93°, shows the tightening effect on the inside wheel. This segment, if turned end for end and upside down, is identical with the curve OB, in Fig. 10. It is also identical with the segment E'C, running from 58° to 93° on the right of Fig. 11.

In other words, the curve HG shows, by the algebraic difference of its ordinates at two points the change in the brake tightness resulting from turning the wheel between these two points. If the initial position is to the left of the final, in Fig. 11, the brake loosens, and vice versa.

Fig. 11, therefore, can be used to solve any problem in which the vertical axis and the king pin axis are at an angle $\cos^{-1}v=12°26\frac{1}{2}'$, irrespective of how the position of the control shaft and the brake setting angle effected this.

It is obvious that, for the given set-up, in order to effect the result sought, that is, to make the outside wheel brake loosen substantially faster than the inside one tightens, the point E must separate two parts of the curve of substantially different slope; that is, the point E must be at least 40°–45° out from the center of the curve in Fig. 11. This means that the projection of the vertical axis of the XY plane after the brake is set, must be not less than 40°–45° from the X axis. Or, speaking roughly, this implies that the vertical axis must point about as much to the front as to the side, in order to produce the desired effect.

The above illustrated computation has been carried out to 7 decimal places, but 5 are amply sufficient after the first 10 degrees. In Fig. 11, where the curve is almost straight near the origin, 5 places are ample throughout. The 7th figure is of course not reliable.

In the preceding analysis it is shown how to find the result of a given set-up, and the determination of the proper adjustment to produce a specified effect can be found by a few tentative computations, in which, for example, the angle through which the control shaft is turned in setting the brake is varied.

In actual commercial production of numerous models of cars this method of determining the proper adjustments can be simplified. To this end, a family of curves such as DOC, Fig. 11, will be computed and plotted, corresponding to systematically varying angles between the king pin axis and the vertical axis. The curve DOC, as stated, is that derived from the above discussed hypothetical set-up, where the angle in question, $\tau$, is about $12°26\frac{1}{2}'$, having its cosine, $\nu = +0.9766190$. The other four curves shown in Fig. 11 correspond to angles, $\tau$, of $2\frac{1}{2}°, 5°, 7\frac{1}{2}°$ and $10°$, respectively, and are laid off in order from the axis of abscissæ.

Figure 9:
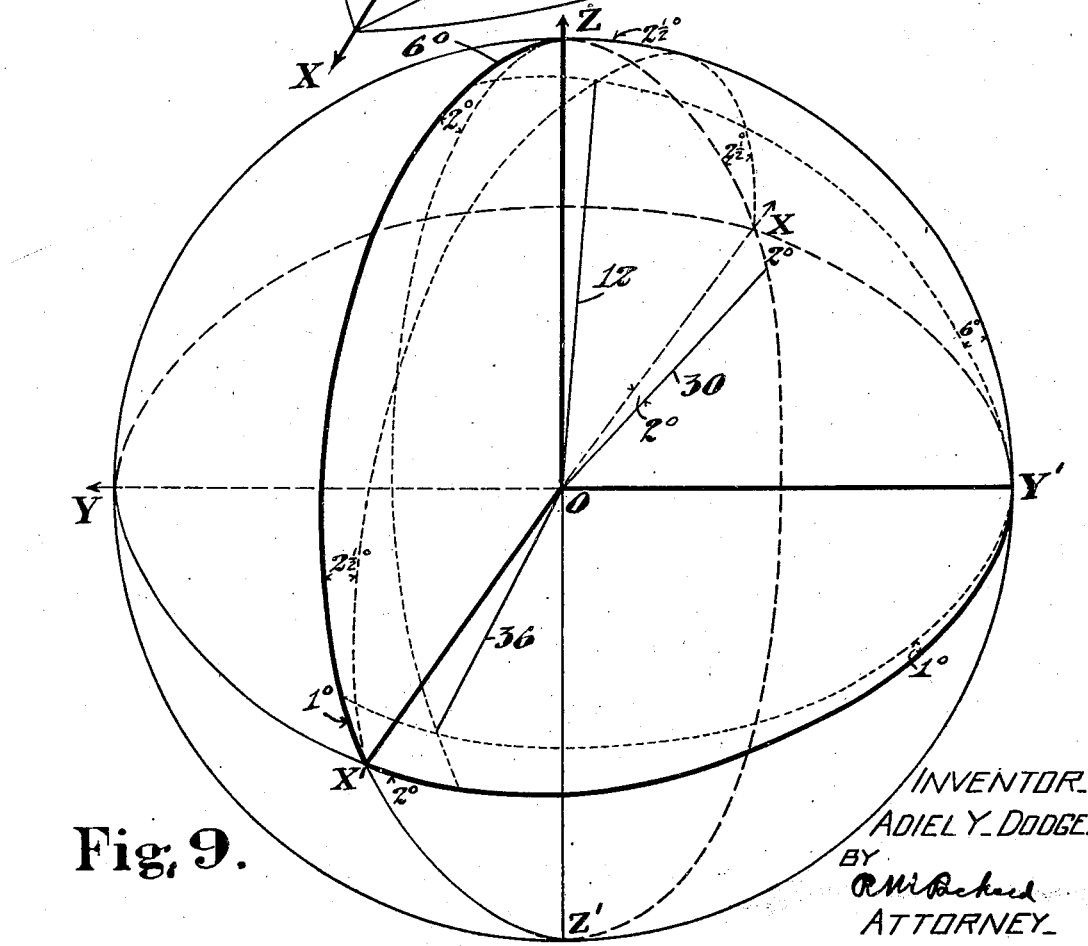
Fig. 9 is a diagram illustrating the set-up chosen for illustration.

Each such curve corresponds to a cone of semi angle $\tau$, and with its axis coincident with the king pin axis, and can be used to show graphically the braking effects of throwing the vertical axis to any position on its surface in setting the brake and turning the wheel. The space characteristics of the machine, determining the set-up, as shown in Fig. 9, determine the path in which the vertical axis must move in setting the brake. As the vertical axis moves over this path (the surface of a cone around the control shaft as axis), it will pass into these $\tau$-conical surfaces, one after the other.

In working out this problem it will be advantageous to introduce the transformation (35) after the computation of (45), before rotating the control shaft to set the brake. Then compute the positions of the vertical axis resulting from a series of rotations of the control shaft, say every degree from 1° to 10°. The resulting series of $\nu$'s will determine the corresponding curves in Fig. 11, and the $\lambda$'s and $\mu$'s, as in (55) will determine the angles $\gamma$ to be used with the curves respectively. The proper segments of each curve will be taken off and plotted as in Fig. 10, and the resulting Fig. 10 will be placed in order and examined. The characteristic sought (for example, making the outside loosening twice the inside tightening for a wheel turn of 25°) will be found to vary systematically through this series of Fig. 10, and the suitable one can be readily selected.

The angle through which the control shaft must now be turned in setting the brake is now known, and it remains only to relatively adjust the cam and brake shoes, and the members 36 and 42 so that the brake will be so set by turning the control shaft through this angle.

On studying Fig. 11 it will be observed that the phenomena as to progressive tightening and loosening reverse at about 93°. If the cam shaft is perpendicular to the vertical axis this point of reversal will come at 90° in Fig. 11. Its location depends on the particular set-up in question.

The above investigation has assumed the vertical axis fixed on the control shaft. Its location on the cam shaft affords no difficulty in treatment. In this case it will be found that if the vertical axis is tilted forward and outside the king pin, when the brake is set, the loosening of the outside brake is less than the tightening of the inside; if the vertical axis is tilted backward and outside of the king pin when the brake is set, the loosening of the outside brake is greater than the tightening of the inside.

Fig. 12 shows the effects of varying positions of the upper end of the vertical axis. The centers of the circles represent the king pin, and the view is taken along the king pin axis from above. In this figure the expression LO>TI is to be read "Loosening of outside brake is greater than tightening of inside brake." The other legends will be clear without explanation. It is understood, of course, that setting up the brake so that the upper end of the vertical axis will be thrown to any compartment of the figure when the brake is set will give rise to the phenomena noted in that compartment. This, of course, refers to conditions before reaching the point of reversal discussed above.

Having described my invention, what I claim as new and desire to secure by Letters Patent of the United States is:

1. A king pin, a wheel and a brake therefor arranged to turn on said king pin, a universal joint for operating the brake comprising a first axis extending generally transverse to the direction of the king pin axis and a second axis perpendicular to the first axis, said second axis, when the brake is set, being tilted out of the plane perpendicular to the straight forward position of the wheel plane and passing through the king pin axis.

2. A king pin, a wheel and a brake therefor arranged to turn on said king pin, a universal joint for operating the brake comprising a first axis extending generally transverse to the direction of the king pin axis and a second axis perpendicular to the first axis, said second axis, when the brake is set, being tilted out of a plane extending transverse to the normal direction of movement of the wheel and containing the king pin axis.

3. A king pin, a wheel and a brake therefor arranged to turn on said king pin, a universal joint for operating the brake comprising a first axis extending generally transverse to the direction of the king pin axis and a second axis perpendicular to the first axis, said second axis, when the brake is set, being tilted forwardly out of a plane extending transverse to the normal direction of movement of the wheel and containing the king pin axis.

4. A king pin, a wheel and a brake therefor arranged to turn on said king pin, a universal joint for operating the brake comprising a first axis extending generally transverse to the direction of the king pin axis and a second axis perpendicular to the first axis, said second axis, when the brake is set, being tilted forwardly relatively to the king pin axis.

5. A king pin, a wheel and a brake therefor arranged to turn on said king pin, a universal joint for operating the brake comprising a first axis extending generally transverse to the direction of the king pin axis and a second axis perpendicular to the first axis, said second axis, when the brake is set, being tilted forwardly and outwardly relatively to the king pin axis.

6. A chassis, a king pin mounted thereon, a wheel and a brake therefor swiveled on the king pin, a shaft for operating the brake, a control shaft mounted on the chassis, a universal joint connecting said shafts having one of its axis extending upwardly, the said elements being so constructed and arranged that when the brake is set the said axis is tilted forwardly relatively to the king pin axis.

7. A chassis, a king pin mounted thereon, a wheel and a brake therefor swiveled on the king pin, a shaft for operating the brake, a control shaft mounted on the chassis, a universal joint connecting said shafts having one of its axes extending upwardly, the said elements being so constructed and arranged that when the brake is set the said axis is tilted forwardly and outwardly relatively to the king pin axis.

8. That improvement in the art of setting up swiveled-wheel brakes operated by a universal joint connection, which consists in so relating the brake and the universal joint that the act of setting the brake tilts the upper end of the upwardly extending axis of the joint into a position in front of the axis around which the wheel swivels.

9. That improvement in the art of setting up swiveled-wheel brakes operated by a universal joint connection, which consists in so relating the brake and the universal joint that the act of setting the brake tilts the upper end of the upwardly extending axis of the joint into a position in front of the axis around which the wheel swivels, in accordance with the theory explained in the annexed specification.

10. That improvement in the art of setting up swiveled-wheel brakes operated by a universal joint connection, which consists in so relating the brake and the universal joint that the act of setting the brake tilts the upper end of the upwardly extending axis of the joint into a position in front of the axis around which the wheel swivels, in accordance with the theory explained in the annexed specification, to make the brake loosening effect of turning the wheel in one direction approximately twice the brake tightening effect of turning the wheel in the opposite direction.

11. That improvement in methods of setting up swiveled wheel brakes operated by a universal joint connection which consists in determining, for a given set-up, the position into which the universal joint is to be thrown in setting the brake, by means of Formula (12) of the annexed specification, and adjusting the brake mechanism so that the act of setting the brake will throw the universal joint into the determined position.

12. That improvement in methods of setting up swiveled wheel brakes operated by a universal joint connection which consists in determining, for a given set-up, the braking effects of throwing the vertical axis of the joint into progressively varying positions, by means of Formula (12), of the annexed specification, selecting that position giving the desired relation between inside and outside wheel effects, and adjusting the brake mechanism to throw the vertical axis of the joint to that position in setting the brake.

13. That improvement in methods of setting up swiveled wheel brakes operated by a universal joint connection which consists in determining, for a given set-up, the braking effects characteristic of progressively varying angular distances between the king pin axis and the vertical axis of the joint when the brake is set by means of Formula (12) of the annexed specification and a family of curves derived therefrom, as illustrated in Fig. 11 of the annexed drawing, selecting the angular distance characteristic of the desired relation between inside and outside wheel effects, and adjusting the brake mechanism to throw the vertical axis of the joint to the determined angular distance from the king pin axis in setting the brake.

14. A king pin, a wheel and a brake therefor arranged to turn on said king pin, a universal joint for operating the brake comprising a first axis extending generally transverse to the direction of the king pin axis and a second axis perpendicular to the first axis, said second axis, when the brake is set, being tilted out of a plane extending transverse to the normal direction of movement of the wheel and containing the king pin axis to an extent determined by means of Formula (12) of the annexed specification, in order to secure a predetermined relation between the braking effects on inside and outside wheels.

15. A king pin slanting upwardly and inwardly toward a vehicle on which it is mounted, a wheel and a brake therefor arranged to turn on the king pin, a cam shaft arranged to set the brake, a control shaft arranged for manual operation by the operator, and a universal joint connecting the cam shaft and the control shaft, comprising a first axis extending generally transverse to the direction of the king pin axis and a second axis perpendicular to the first axis, said second axis, when the brake is set, being tilted forwardly and outwardly relatively to the king pin axis.

16. That improvement in the art of setting up swiveled-wheel brakes operated by a universal joint connection, which consists in so relating the brake and the universal joint that the act of setting the brake tilts the upper end of the upwardly extending axis of the joint into a position in front and outside of the axis around which the wheel swivels, in accordance with the theory explained in the annexed specification.

17. A king pin, a wheel and a brake therefor arranged to turn on said king pin, and a universal joint for operating the brake comprising a first axis extending generally transverse to the direction of the king pin axis and a second axis perpendicular to the first axis, said second axis, when the brake is set, being tilted from the king pin axis both in a fore and aft direction and in a lateral direction, relatively to the wheel to secure a predetermined relation between the braking effects on the wheel when turned the same amount to the right and to the left respectively, the position of the said second axis when the brake is set, and the effects of said position on the said braking effects being determined by the following formula $$x_1 - \alpha = a_{11}(x-\alpha) + a_{12}(y-\beta) + a_{13}(z-\gamma)$$
$$y_1 - \beta = a_{21}(x-\alpha) + a_{22}(y-\beta) + a_{23}(z-\gamma)$$
$$z_1 - \gamma = a_{31}(x-\alpha) + a_{32}(y-\beta) + a_{33}(z-\gamma)$$

where $Na_{11} = k^2 + l^2 - m^2 - n^2$  $Na_{12} = 2(lm - kn)$  $Na_{13} = 2(ln + km)$
$Na_{21} = 2(lm + kn)$  $Na_{22} = k^2 - l^2 + m^2 - n^2$  $Na_{23} = 2(mn - kl)$
$Na_{31} = 2(ln - km)$  $Na_{32} = 2(mn + kl)$  $Na_{33} = k^2 - l^2 - m^2 + n^2$ $$k = \cot \frac{\theta}{2} \quad \frac{1}{N} = \frac{1}{k^2 + 1} = \sin^2\left(\frac{\theta}{2}\right)$$

where $\theta$ is the angle of wheel turn, $(\alpha, \beta, \gamma)$ are the co-ordinates of a point of the king pin axis, referred to a system of cartesian co-ordinates, $l, m, n,$ are the direction cosines of the king pin axis, and $(x_1, y_1, z_1)$ and $(x, y, z)$ are the co-ordinates of any selected point of the mechanism after and before the rotation.

In testimony whereof I have signed my name to this specification.

ADIEL Y. DODGE.

Certificate of Correction

Patent No. 1,749,022. Granted March 4, 1930, to

ADIEL Y. DODGE

It is hereby certified that error appears in the printed specification of the above numbered patent requiring correction as follows: Page 1, line 14, strike out the comma after the word "somewhat" and insert the same after "backward"; page 2, line 13, after "herein" insert a semicolon; page 5, lines 111 to 114, strike out the equations and insert instead $$\frac{z}{y}=\tan \alpha \quad \frac{x}{z}=\tan \beta \quad \frac{y}{x}=\tan \gamma;$$

page 6, line 19, "$\sqrt{1-n^2}$" should read $\sqrt{1-n^2}$; line 23 for "Formula (16) gives" read *Formulæ (16) give;* and line 67 for "$i, m, n$" read $l, m, n;$ page 7, line 67, for "$x^1$" read $x'$; page 8, lines 1 to 4, strike out the equations and insert instead $$\cot^2\alpha = 0.0019063$$
$$\tan^2\beta = 0.0110469$$
$$\frac{1}{n^2}=\frac{1.}{1.0129532}$$

same page, lines 12 to 15, strike out the equations and insert $$\cot^2\beta = 0.0003047$$
$$\tan^2\gamma = 0.0012195$$
$$\frac{1}{d^2}=\frac{1.}{1.0015242}$$

same page, line 37, strike out "$S_0$" and insert $s_0$; line 53, in the equation the "$\lambda_0=$" should be raised to the fraction line; and line 97, strike out the numeral "9" at the end of the first fraction; page 9, line 1, " $=0$" should read " $-0$"; page 10, lines 40 and 56, for the minus sign read $=$; page 12, line 35, claim 6, for "axis" read *axes;* and that the said Letters Patent should be read with these corrections therein that the same may conform to the record of the case in the Patent Office.

Signed and sealed this 1st day of July, A. D. 1930.

[SEAL]

M. J. MOORE,
*Acting Commissioner of Patents.*